US010936635B2

(12) United States Patent
Kumbhar et al.

(10) Patent No.: US 10,936,635 B2
(45) Date of Patent: Mar. 2, 2021

(54) CONTEXT-BASED GENERATION OF SEMANTICALLY-SIMILAR PHRASES

(71) Applicant: International Business Machines Corporation, Armonk, NY (US)

(72) Inventors: Kaluram Kumbhar, Pune (IN); Sreenath Raghunath, Pune (IN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 16/153,881

(22) Filed: Oct. 8, 2018

(65) Prior Publication Data

US 2020/0110836 A1 Apr. 9, 2020

(51) Int. Cl.

*G06F 16/30* (2019.01)
*G06F 16/33* (2019.01)
*G06K 9/00* (2006.01)
*G06F 16/332* (2019.01)
*G06F 40/30* (2020.01)
*G06F 40/40* (2020.01)
*G06F 40/263* (2020.01)

(52) U.S. Cl.

CPC ........ *G06F 16/3338* (2019.01); *G06F 16/334* (2019.01); *G06F 16/3325* (2019.01); *G06F 40/263* (2020.01); *G06F 40/30* (2020.01); *G06F 40/40* (2020.01); *G06K 9/00302* (2013.01)

(58) Field of Classification Search

CPC ........... G06F 40/40; G06F 40/51; G06F 40/56
See application file for complete search history.

(56) References Cited

U.S. PATENT DOCUMENTS 5,373,441 A * 12/1994 Hirai .................. G06F 15/0283 704/2
5,541,838 A * 7/1996 Koyama ................ G06F 40/55 704/4
6,453,280 B1 * 9/2002 Yang .................... G06F 40/211 704/10

(Continued)

OTHER PUBLICATIONS

Article entitled "Scaling Phrase-Based Statistical Machine Translation to Larger Corpora and Longer Phrases", dated Jun. 2005, by Callison-Burch et al.*

(Continued)

*Primary Examiner* — Mahesh H Dwivedi
(74) *Attorney, Agent, or Firm* — Reza Sarbakhsh; Edell, Shapiro & Finnan, LLC

(57) ABSTRACT

A computer system processes a document. A user viewing a displayed text is monitored and it is determined that the user is experiencing difficulty understanding a query phrase in a displayed text, wherein the displayed text is translated from a first language to a second language. One or more alternative phrases are generated for the query phrase by determining a plurality of candidate phrases based on the context of the query phrase and a tone of the displayed text, scoring each of the plurality of candidate phrases, and selecting a candidate phrase to be the alternative phrase based on the score of the candidate phrase. The one or more alternative phrases are presented to the user. Embodiments of the present invention further include a method and program product for processing a document in substantially the same manner described above.

18 Claims, 5 Drawing Sheets

(56) References Cited

U.S. PATENT DOCUMENTS

| | | | | |
|---|---|---|---|---|
| 8,214,197 | B2 * | 7/2012 | Kamatani | G06F 40/45 704/2 |
| 9,053,090 | B2 | 6/2015 | Anisimovich et al. | |
| 9,098,488 | B2 | 8/2015 | Hamid et al. | |
| 9,779,085 | B2 | 10/2017 | Wick et al. | |
| 9,817,821 | B2 | 11/2017 | Rylov et al. | |
| 2002/0103799 | A1 * | 8/2002 | Bradford | G06F 16/3346 |
| 2007/0294076 | A1 * | 12/2007 | Shore | G06F 40/58 704/2 |
| 2008/0319962 | A1 * | 12/2008 | Riezler | G06F 16/3338 |
| 2011/0184721 | A1 * | 7/2011 | Subramanian et al. | G10L 19/0018 704/4 |
| 2014/0172411 | A1 * | 6/2014 | Kim | G06F 40/51 704/2 |
| 2015/0051898 | A1 * | 2/2015 | Cuthbert | G06F 40/58 704/3 |
| 2015/0199340 | A1 * | 7/2015 | Kwon | G06F 40/35 704/2 |
| 2016/0027452 | A1 * | 1/2016 | Kalinli-Akbacak | G10L 25/63 704/240 |
| 2016/0070543 | A1 * | 3/2016 | Nethery, III | G06F 8/30 717/110 |
| 2017/0161264 | A1 * | 6/2017 | Zhao | G06F 40/58 |
| 2018/0067927 | A1 * | 3/2018 | Gadepalli | G06F 40/30 |
| 2018/0089173 | A1 * | 3/2018 | Prendergast | G06F 40/58 |
| 2018/0165275 | A1 * | 6/2018 | Kochura | G06F 40/55 |
| 2018/0203847 | A1 * | 7/2018 | Akkiraju | G06F 16/3329 |

OTHER PUBLICATIONS

Article entitled "Translation of Multiword Expressions Using Parallel Suffix Arrays", by McNamee et al., dated Aug. 2006.*

Kim et al., Emotion Detection Algorithm Using Frontal Face Image, ICCAS2005, Jun. 2-5, KINTEX, Gyeonggi-Do, Korea, pp. 2373-2378.

Liu, Building Skip-Thought Vectors for Document Understanding, Intel AI, Jan. 6, 2017, https://ai.intel.com/building-skip-thought-vectors-document-understanding/, pp. 1-9.

* cited by examiner

CONTEXT-BASED GENERATION OF SEMANTICALLY-SIMILAR PHRASES

BACKGROUND

1. Technical Field

Present invention embodiments relate to natural language processing (NLP) systems, and more specifically, to generating context-based semantically-similar phrases.

2. Discussion of the Related Art

Machine translation refers to a field of computational linguistics in which software is used to translate text or speech from one natural language to another. Various approaches to machine translation may employ techniques such as word substitution, neural network techniques, and statistical analysis of sample bodies of text known as corpora. However, when machine translation is used to translate a word or phrase from one language to another, the resulting direct translation of the word or elements of the phrase may not always convey the meaning and intent of the original word or phrase in the given context.

SUMMARY

According to one embodiment of the present invention, a computer system processes a document. A user viewing a displayed text is monitored and it is determined that the user is experiencing difficulty understanding a query phrase in a displayed text, wherein the displayed text is translated from a first language to a second language. One or more alternative phrases are generated for the query phrase by determining a plurality of candidate phrases based on the context of the query phrase and a tone of the displayed text, scoring each of the plurality of candidate phrases, and selecting a candidate phrase to be the alternative phrase based on the score of the candidate phrase. The one or more alternative phrases are presented to the user. Embodiments of the present invention further include a method and program product for processing a document in substantially the same manner described above.

BRIEF DESCRIPTION OF THE DRAWINGS

Generally, like reference numerals in the various figures are utilized to designate like components.

DETAILED DESCRIPTION

Figure 1:
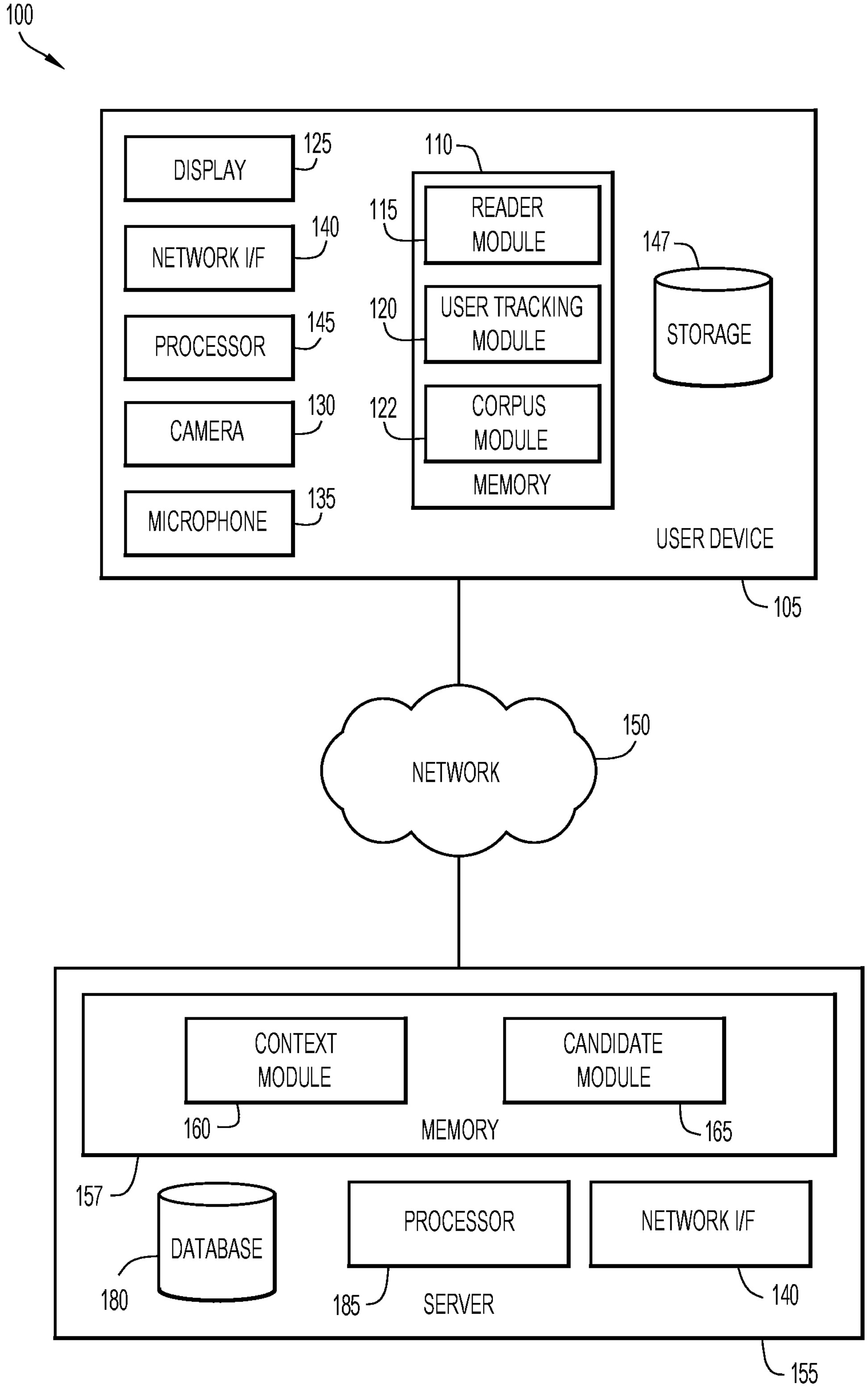
FIG. 1 is a block diagram depicting a computing environment for generating semantically-similar phrases in accordance with an embodiment of the present invention.

Present invention embodiments relate generally to natural language processing (NLP), and more specifically, to generating context-based semantically-similar language translations. When a document is translated from one language to another using conventional machine translation approaches, words or phrases that appear in the translated document may not accurately capture the meaning of the words or phrases as they were used in the original document. Words or phrases that are ambiguous, have multiple definitions, or are idiomatic may be particularly difficult to translate accurately, leading to reader confusion. Phrasal-level translation may be difficult to achieve due to word-by-word translation causing loss of information. For example, a word-by-word translation of the phrase "watershed moment" from English to another language would lose the meaning of the idiomatic expression, as the phrase refers to a turning point or shift, and not to a literal watershed (i.e. a geographical feature that separates water flows into different basins).

Present invention embodiments detect when an individual is experiencing difficulty with a word or phrase while reading a document, and generate an alternative word or phrase to suggest to the individual so that he or she might better understand the document. The alternative words or phrases may be generated by finding words or phrases that are semantically similar to the original words or phrases in the given context. Semantic similarity may be determined by analyzing the local context of a query phrase in terms of the other words or phrases that tend to appear before and/or after the query phrase, and then finding candidate alternative phrases that appear in similar contexts.

Conventional approaches for single word phrases may cluster contexts into sets of induced senses, or dynamically modify a word's vector according to each given context. Present invention embodiments compare single word phrases directly with well-developed word embedding using scoring functions. Similarly, whereas conventional approaches for multi-word phrases attempt to use compositional distributional semantic methods to formalize the meaning of compound words by applying vector composition functions on the vectors associated with the words, present invention embodiments address phrasal synonymy by treading phrases distinct entities rather than as consisting of individual constituent words. Thus, present invention embodiments may analyze the semantics of a phrase as a distinct entity rather than a collection of constituent words.

By analyzing the context of a word or phrase, present invention embodiments are not limited to discovering synonyms in a text, but can find also near-synonyms, which are words or phrases that are similar, but do not rise to the level of complete contextual substitutability, or absolute synonymy. The identification of near-synonym phrases provides many advantages in the field of text mining, as more results are discoverable when a mining approach has the ability to search texts for near-synonyms in addition to absolute synonyms. Thus, present invention embodiments generate one or more alternative phrases based on their semantic similarity to a query phrase by using a monolingual corpus to analyze the context of the query phrase.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for generating semantically-similar phrases in accordance with an embodiment of the present invention. As depicted, computing environment 100 includes a user device 105, a network 150, and a server 155. It is to be understood that the functional division among components of computing environment 100 have been chosen for purposes of explaining the present invention and is not to be construed as a limiting example.

User device 105 includes memory 110, a display 125, a camera 130, a microphone 135, a network interface 140, at least one processor 145, and storage 147. Memory 110 includes a reader module 115, a user tracking module 120, and a corpus module 122. In various embodiments of the present invention, user device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 140 enables components of user device 105 to send and receive data over a network, such as network 150. User device 105 may include internal and external hardware components, as depicted and described in further detail with respect to FIG. 5.

Reader module 115, user tracking module 120, and corpus module 122 may include one or more modules or units to perform various functions of present invention embodiments described below. Reader module 115, user tracking module 120, and corpus module 122 may be implemented by any combination of any quantity of software and/or hardware modules or units, and may reside within memory 110 of user device 105 for execution by a processor, such as processor 145.

Reader module 115 may include any application that enables a user of user device 105 to view and read text documents. The text documents may include books, journals, news articles, e-mails, text messages, or any other form of text-based document. Reader module 115 may facilitate a conversation between a user and one or more individuals by presenting messages sent to the user from the other participant(s) to the user. In some embodiments, reader module 115 presents documents that have been translated from one language to another. Reader module 115 may enable a user to select one or more words or phrases in order to request synonyms; for example, a user may select a particular phrase to request one or more alternative phrases that are semantically similar to the selected phrase.

User tracking module 120 may track a user's interaction with user device 105 in order to determine if a user is experiencing difficulty reading a particular document. User tracking module 120 may analyze photographs and/or video of a user that are captured by camera 130 of user device 105. In some embodiments, user tracking module 120 tracks a user's eye movement and facial expressions to determine whether a user is experiencing difficulty reading a document. For example, if a user's gaze lingers on an area of display 125 corresponding to a certain word or phrase in the document, then user tracking module 120 may determine that the user is having difficulty understanding the corresponding word or phrase. Likewise, if a user re-reads a word or phrase multiple times, or displays a particular facial expression that indicates frustration while reading a word or phrase, then user tracking module 120 may determine that the user is experiencing difficulty understanding the word or phrase. When a user is participating in a conversation using user device 105, user tracking module 120 may determine the emotional state of the user in order to determine the significance and tone of the document.

Corpus module 122 may assemble a corpus of words and phrases that a user has previously used. Corpus module 122 may add new entries to the corpus in response to a user using a word or phrase for the first time, or in response to the user using the word or phrase a particular number of times. Corpus module 122 may build a corpus by gathering words and phrases that a user has previously used and/or read without difficulty. For example, corpus module 122 may access microphone 135 of user device 105 in order to convert a user's speech into text using conventional or other speech-to-text processing techniques; once converted to text, corpus module 122 may add the word or phrase to the corpus. Corpus module 122 may also add any words or phrases to the corpus that appear in media to which a user subscribes via user device 105, as well words or phrases that appear in e-mails and short message service (SMS) messages sent or received via user device 105. Corpus module 122 may store the corpus on storage 147.

Display 125 may include any output device for presenting information in a visual form, such as a liquid crystal display (LCD), a cathode ray tube (CRT) display, or a light-emitting diode (LED) display. Display 125 may enable a user of user device 105 to read text documents, including any documents that are presented via reader module 115.

Camera 130 may be any conventional or other image capture device capable of still photography and/or videography. In some embodiments, camera 130 is capable of tracking the gaze of a user of user device 105. Microphone 135 may include any transducer capable of converting sound to an electrical signal.

Storage 147 may include any non-volatile storage media known in the art. For example, storage 147 can be implemented with a tape library, optical library, one or more independent hard disk drives, or multiple hard disk drives in a redundant array of independent disks (RAID). Similarly, data on storage 147 may conform to any suitable storage architecture known in the art, such as a file, a relational database, an object-oriented database, and/or one or more tables. Storage 147 may store a user's corpus that is generated and collated by corpus module 122.

Network 150 may include a local area network (LAN), a wide area network (WAN) such as the Internet, or a combination of the two, and includes wired, wireless, or fiber optic connections. In general, network 150 can be any combination of connections and protocols that will support communications between user device 105 and server 155 via their respective network interfaces 140 in accordance with embodiments of the present invention.

Server 155 includes memory 157, a database 180, a network interface 140, and at least one processor 185. Memory 157 may include a context module 160 and a candidate module 165. In general, server 155 receives a query phrase and outputs one or more semantically similar phrases based on the context of the query phrase. Server 155 may include internal and external hardware components, as depicted and described in further detail with respect to FIG. 5.

Context module 160 and candidate module 165 may include one or more modules or units to perform various functions of present invention embodiments described below. Context module 160 and candidate module 165 may be implemented by any combination of any quantity of software and/or hardware modules or units, and may reside within memory 157 of server 155 for execution by a processor, such as processor 185.

Context module 160 may collect and filter contexts for a query phrase. Context module 160 may receive a query phrase, along with the context of the query phrase as it appears in a phrase corpus, which is stored in database 180 and is distinct from the user's corpus. The phrase corpus may include a large sample of written texts in the same language as the phrase corpus. Context module 160 may search the phrase corpus for contexts in which the query phrase appears. A context may include one or more words appearing before a query phrase, and/or one or more words appearing after a query phrase. For example, if a query phrase is "sea change," then the context ". . . has undergone a major sea change in the last five . . . " and "admitted, without a sea change in public opinion . . . " represent two different contexts for "sea change." The word or words appearing before a query phrase may be referred to as a preceding context, the word or words appearing after the query phrase may be referred to as a succeeding context, and the words appearing before and after the query phrase (e.g., the combined preceding and succeeding context) may together be referred to as a cradle context.

Context module 160 may then filter the query phrase out of each context to generate tokens, such as " . . . has undergone a major" and " . . . admitted, without a," and contexts that appear after the query phrase, such as "in the last five . . . " and "in public opinion . . . ." The tokens generated by context module 160 may be n-gram tokens, where n is equal to the number of words in each token; for example, " . . . has undergone a major" is a 4-gram token, and "in public opinion . . . " is a 3-gram token.

Candidate module 165 may identify and rank candidate phrases by searching the phrase corpus for all instances of the n-gram tokens representing preceding contexts, succeeding contexts, and/or cradle contexts. Candidate module 165 may then filter out any candidate phrase that appears adjacent to the n-gram token in the place previously occupied by the query phrase. For example, candidate module 165 may search the phrase corpus for all appearances of the phrase " . . . has undergone a major," which yields the results of " . . . has undergone a major shift," " . . . has undergone a major turning point," and the like. Candidate module 165 then extracts the candidate phrases "major shift" and "turning point," which are considered as candidate phrases that may be semantically similar to the query phrase "sea change."

Once candidate module 165 has filtered out candidate phrases, candidate module 165 may rank the phrases. In some embodiments, candidate module 165 ranks the phrases according to a shared feature gain algorithm, and further refines the ranking using a ranking function based on Kullback-Leibler divergence. The ranking algorithms that may be employed by candidate module 165 are discussed in further detail with reference to FIG. 3 below.

Database 180 may include any non-volatile storage media known in the art. For example, database 180 can be implemented with a tape library, optical library, one or more independent hard disk drives, or multiple hard disk drives in a redundant array of independent disks (RAID). Similarly, data on database 180 may conform to any suitable storage architecture known in the art, such as a file, a relational database, an object-oriented database, and/or one or more tables. Database 180 may store data corresponding a phrase corpus for use by context module 160 and/or candidate module 165.

Figure 2:
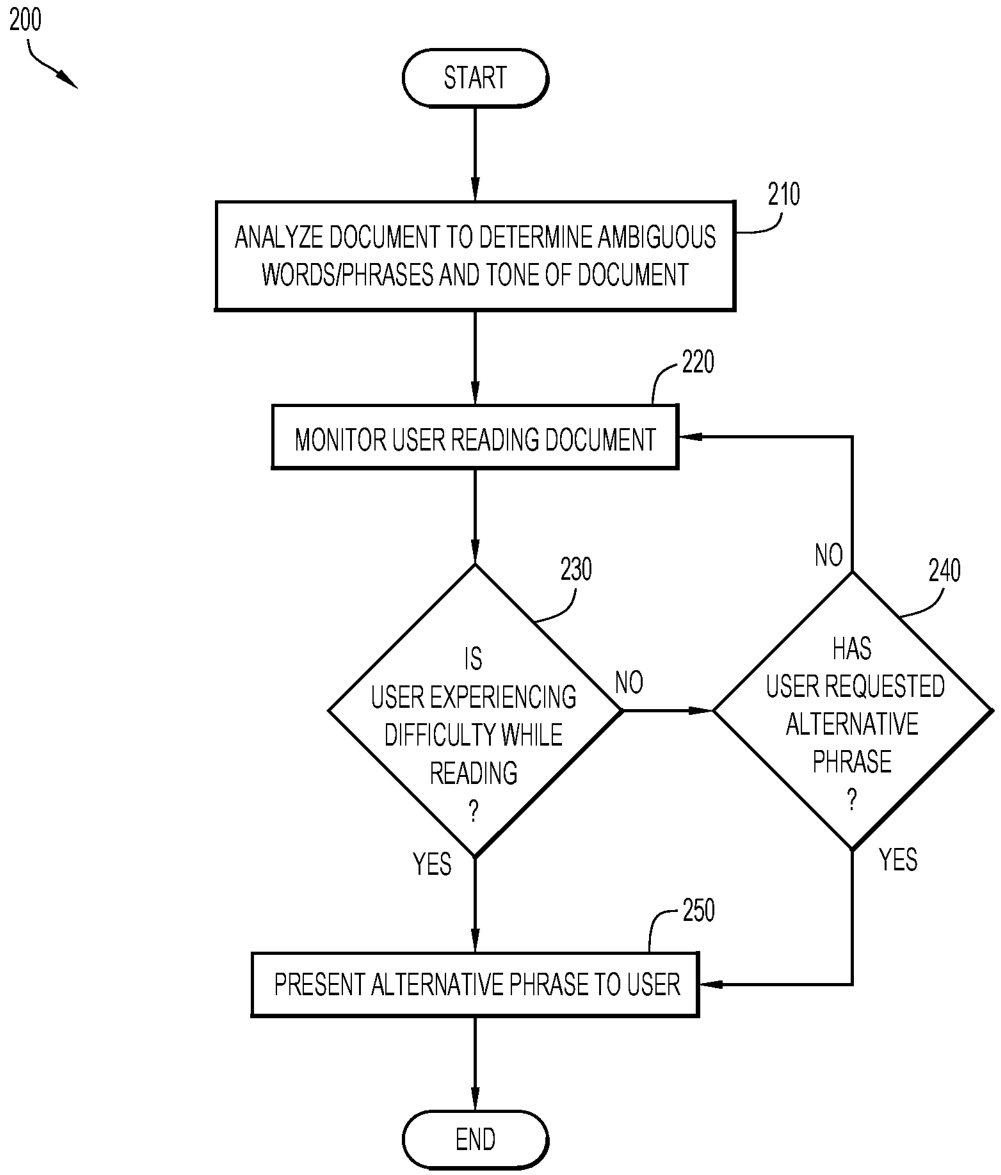
FIG. 2 is a flow chart depicting a method of providing alternative phrases to a user in accordance with an embodiment of the present invention.

FIG. 2 is a flow chart depicting a method 200 of providing alternative phrases to a user in accordance with an embodiment of the present invention.

A document is analyzed to determine ambiguous words and phrases in the document and the tone of the document at operation 210. Multi-word expressions (e.g., phrases) may be distinguished from a non-phrasal sequence of words according to a compositional-distributional semantic model, which identifies entity categories by grouping sets of entities that share common characteristics. A compositional-distributional semantic model may be based on syntactic analysis, distributional semantics, and named entity recognition to recognize paraphrases of entity categories. For example, in the sentence "XYZ Corporation is a Brazilian aerospace conglomerate that produces commercial and agricultural aircraft," "XYZ Corporation" and "Brazilian aerospace conglomerate" are sequences of words that may be identified as phrases, whereas "produces commercial and" would not be identified as a phrase.

In some embodiments, user tracking module 120 identifies any ambiguous words and phrases as well as the tone of the document. The document that is analyzed may include any document that is readable by a user using reader module 115 of user device 105. Words and phrases may be identified as ambiguous according to the number of different usages or meanings in a language. Each word or phrase in the document may be provided with an ambiguity score that indicates whether a word or phrase is ambiguous. In some embodiments, an ambiguity score of 1 indicates that the word or phrase has multiple meanings in literature, whereas a score of −1 indicates that the word or phrase does not. For example, the word "wheelbarrow" would receive a score of −1, as it has a rather specific meaning in English. Alternatively, words like "thing" or "light" have multiple meanings in English which can only be discerned based on the context of the usage, so these words would receive ambiguity scores of 1. In some embodiments, idiomatic phrases and other phrases consisting of specific combinations of words may be identified. The document may also be analyzed to determine a tone of the document using conventional or other tone detection techniques. For example, a document may be identified as having one or more tones, including anger, disgust, fear, joy, sadness, analytical, confident, degree of tentativeness, degree of openness, degree of conscientiousness, degree of extraversion, degree of agreeableness, and degree of emotional range.

A user is monitored or observed while reading a document at operation 220. User tracking module 120 may monitor or observe the user while the user is reading a document that is presented on display 125 of user device 105. As the user reads the document, user tracking module 120 may track a user's gaze and facial expressions using camera 130.

Operation 230 determines whether the user is experiencing difficulty reading the document. User tracking module 120 may determine that a user is experiencing difficult reading the document when the user reads more slowly than the user's usual reading speed. A user's reading speed may be determined according to how frequently the user scrolls through lines or pages in a document, and/or by using conventional or other gaze tracking techniques that analyze images captured by camera 130. In some embodiments, a user's baseline or average reading speed may be determined, and a time matrix may be developed in order to relate the difficulty level experienced by the user as a function of the user's reading speed. Additionally or alternatively, user tracking module 120 may determine that a user is experiencing difficulty reading a portion of a document when the user re-reads the same portion of the document one or multiple times, as determined according to conventional or other gaze tracking techniques. User tracking module 120 may also determine a user is experiencing difficulty reading a document based on a user's facial expressions made while reading the document. One or more images captured by camera 130 that include a user may be processed to determine whether a user is making a facial expression that corresponds to confusion, frustration, and the like. When operation 230 determines that a user is experiencing difficulty reading a document, an alternative phrase is presented to the user at operation 250.

If it is determined that a user is not experiencing difficulty while reading a document at operation 230, operation 240 determines whether the user has requested an alternative translation for a phrase appearing in the document. A user may manually interact with reader module 115 of user device 105 in order to clarify a selected phrase by requesting one or more alternative phrases.

An alternative phrase is presented to the user at operation 250. The phrase selected by a user may be sent from user device 105 to server 155 as a query phrase, which server 155 processes in order to respond with one or more alternative phrases. Server 155 may generate alternative phrases by processing the query phrase using context module 160 and candidate module 165, as discussed in further detail in reference to FIG. 3 below. In some embodiments, multiple alternative phrases may be provided to a user; the alternative phrases may be ranked according to how well each alternative phrase matches the query phrase, and presented to the user in descending order at the user's request. For example, if a user experiences confusion with regard to a particular phrase and, upon requesting an alternative phrase, is confused by the alternative phrase presented, the user may request additional alternative phrases until the user understands the meaning of the query phrase.

Figure 3:
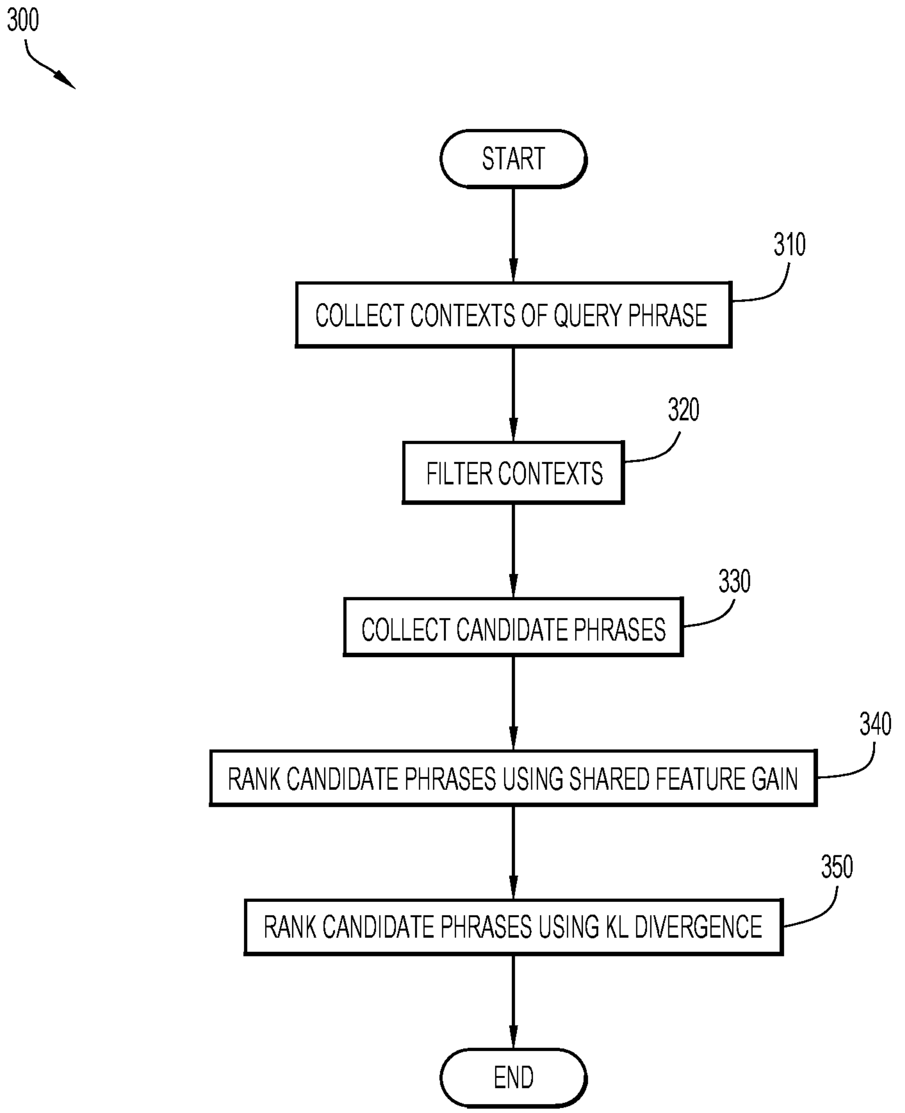
FIG. 3 is a flow chart depicting a method of generating semantically-similar translations in accordance with an embodiment of the present invention.

FIG. 3 is a flow chart depicting a method 300 of generating semantically-similar phrases in accordance with an embodiment of the present invention.

Contexts of a query phrase are collected at operation 310. Context module 160 receives a query phrase from user device 105 and search a phrase corpus using the query phrase to find contexts of the phrase. For example, the query phrase "sea change" may have contexts such as " . . . has undergone a major sea change in the last five . . . ," "table would create a sea change in behavior . . . ," " . . . the beginning of a sea change in their own move . . . " and the like. The word or words appearing before the query phrase may be defined as the preceding context, and the word or words appearing after the query phrase may be defined as the succeeding context. The concepts of preceding and succeeding may be defined according to the reading order of the language; for example, in a left-to-right language, the words to the left of a phrase are a preceding context, whereas in a right-to-left language, the words to the left of a phrase are instead a succeeding context. A combined left and succeeding context may be defined as a cradle context. The amount of words in each context may be adjustable according to a predefined n-gram token; for example, if context module 160 is instructed to retrieve 4-gram tokens, then a preceding context will include the four words immediately preceding each example of the query phrase as it appears in the phrase corpus. In some embodiments, a phrase corpus is selected according to the tone of the document and/or the emotional state of the user. For example, if tone analysis indicates that a document has an analytical tone, then a phrase corpus may be selected that is composed of examples of language that likewise have analytical tones.

The contexts are filtered at operation 320. Context module 160 may filter the preceding contexts, succeeding contexts, and cradle contexts in order to separate the contexts from the query phrase. For example, if searching a phrase corpus according to a 4-gram token and using the query phrase "sea change" returns a context result of " . . . market would mark a sea change in how the government . . . ," then the preceding context " . . . market would mark a" and the succeeding context "in how the government . . . " may both be filtered out.

Candidate phrases are collected at operation 330. Candidate phrases are phrases that occur adjacent to the filtered contexts, just as the query phrase did. Candidate phrases may be found by querying the phrase corpus using the filtered contexts. For example, the phrase corpus may be searched using the preceding context " . . . market would mark a," with any phrases that appear immediately after the preceding context being returned as results. Following this example, candidate phrases may include "lot of volatility," "fundamental shift," "turning point," "shift," "new trend," and the like. Candidate phrases may be filtered according to minimum and maximum candidate phrase lengths as measured in words. In some embodiments, a minimum candidate phrase length may one word, and a maximum candidate phrase length may be defined according to the expression $d_1 \times QL+d_0$, with $d_1$ and $d_0$ being pre-defined constant parameter values, and QL being the query phrase length in words. Thus, if $d_1=2$ and $d_1=1$, a query phrase that is three words long will have a maximum candidate phrase length of $2\times3+1$, or seven words.

The candidate phrases are ranked using a shared feature gain algorithm at operation 340. In some embodiments, each candidate phrase is provided with a score. The runtime calculate for scoring candidate phrases may be calculated using the expression $O((QL+\log(N)+f(q)\times XL_{max})+(XL_{max}+\log(N)+f(x)_{max}\times CL_{max})\times|X|+(CL_{max}+\log(N))\times|Y|)$. O indicates that the runtime may be expressed in terms of how quickly the runtime grows relative to the input as the input gets larger, and is known as big O notation, a form of Bachmann-Landau notation. QL represents the query phrase length measured as a number of words. N may represent the total number of words and/or phrases in a corpus, and f(q) may represent the frequency of q, the query phrase. $XL_{max}$ may represent the maximum permitted one-sided context length, which corresponds to the n-gram token length of operation 310, and $f(x)_{max}$ may represent the highest-frequency context in X, the set of contexts (left, right, and cradle) of q. $CL_{max}$ may represent the maximum candidate phrase length (i.e., $d_1 \times QL+d_0$), and Y may represent the set of mined near-synonym candidates of q. In some embodiments, the shared feature gain algorithm is processed in parallel using multiple suffix arrays, thereby reducing the overall processing time required to score each candidate phrase. In some embodiments, the candidate phrases are ranked according to each of their contexts using a shared feature gain scoring function that according to equation (1):

$$SL(y,q)=\Sigma_{x\in L(q)}\mathrm{CQR}(x,q)\mathrm{CCS}(y,x)k(y)\mathrm{Inf}(x) \quad \text{Equation (1)}$$

with x representing the candidate phrase, q representing the query phrase, CQR(x,q) representing a context query relevance, CCS representing a candidate contextual strength, k(y) being a normalization factor, and Inf(x) referring to the infimum. The context query relevance, CQR(x,q) may be calculated according to p(x,q)/p(q) or f(x,q)/f(q), where p and f are the probability and frequency points in a distribution. CCS(y,x) may be calculated according to p(y,x)/p(x) or f(y,x)/f(x), which measures how strongly related the query phrase contexts are to the potential near synonym candidate phrases as compared to other local contexts surrounding them.

The candidate phrases are ranked using a ranking function based on Kullback-Leibler divergence at operation 350. Once the candidate phrases that are ranked according to the shared feature gain algorithm, a predetermined number of the highest-ranked phrases may be selected and re-ranked using a function based on Kullback-Leibler divergence. In some embodiments, the top one thousand candidate phrases, as determined according to the shared feature gain algorithm, are re-ranked using a function based on Kullback-Leibler divergence.

Figure 4:
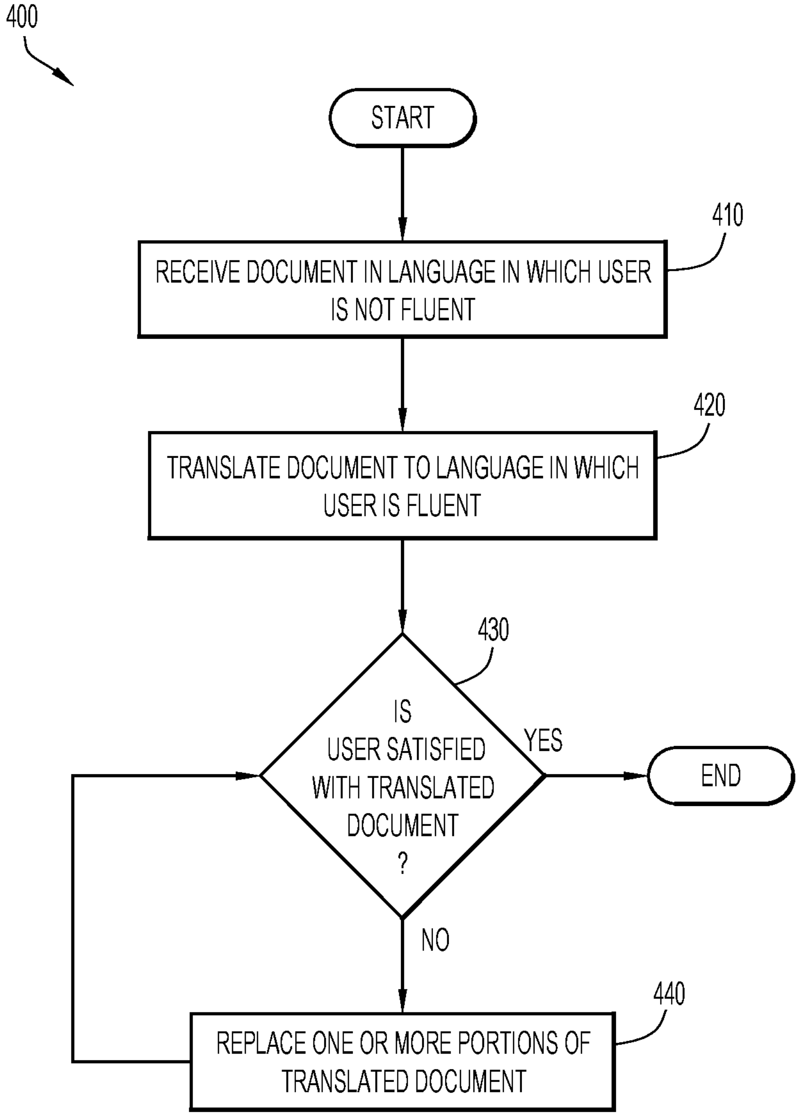
FIG. 4 is a flow chart depicting a method of providing assistance to a user in accordance with an embodiment of the present invention.

FIG. 4 is a flow chart depicting a method 400 of providing assistance to a user in accordance with an embodiment of the present invention.

A document is received in a language in which a user is not fluent at operation 410. In some embodiments, a document is received by user device 105 and opened using reader module 115. The document may be in a language in which the user possesses little or no fluency. The user may provide to user device 105 a selection of one or more languages in which the user is fluent. In some embodiments, fluency is determined according to a language setting of user device 105; for example, if user device 105 is set in "English" mode, then any non-English language may be considered to be a language that is not understood by the user. In some embodiments, a user may manually indicate that the user does not understand the language of the received document.

The document is translated into a language in which the user is fluent at operation 420. In some embodiments, the document is translated by reader module 115. Translation may be performed using conventional or other machine translation techniques. In some embodiments, the document is translated automatically when received by user device 105. The user may also manually provide the pre-translated text to a service or translation system for translation. In some embodiments, user device 105 translates any language not understood by the user into a language that is spoken by the user, such as a language selected in a language setting option for user device 105.

Operation 430 determines whether the user is satisfied with the translated document. User tracking module 120 may determine that a user is not satisfied with the translated document based on factors such as a user's facial expressions and emotional states while reading the translated document, and a user re-reading portions of the document (e.g., as determined using conventional or other eye tracking techniques). In some embodiments, a user indicate dissatisfaction with the translated document manually by requesting one or more portions of the translated document to be replaced.

One or more portions of the translated document are replaced at operation 440. Any portion of the document that the user is struggling to understand may be replaced. In some embodiments, a portion of the translated document, such as one or more words and/or phrases, are replaced by generating semantically-similar alternative language (e.g., according to embodiments presented herein). In some embodiments, when a user experiences difficulty with a particular phrase in the translated document, the original document is processed to generate an alternative phrase for the pre-translated phrase, and the alternative phrase is then translated into the selected language in which the user is fluent. Operation 440 may repeat one or more times until a user is satisfied with the translated document.

Figure 5:
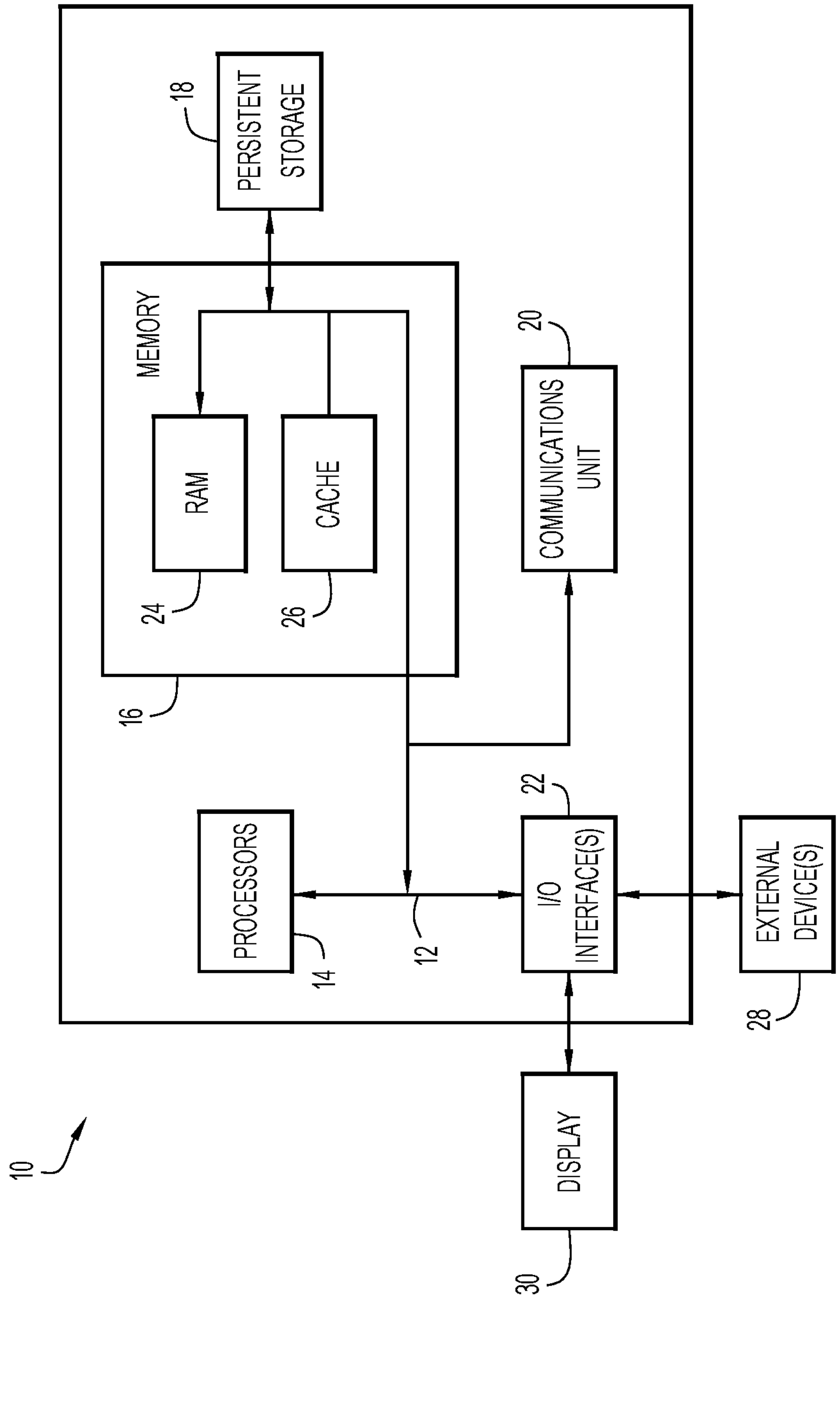
FIG. 5 is a block diagram depicting a computing device in accordance with an embodiment of the present invention.

FIG. 5 is a block diagram depicting components of a computer 10 suitable for executing the methods disclosed herein. Computer 10 may implement user device 105 and/or server 155 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to generating semantically-similar phrases (e.g., user corpora, phrase corpora, user documents, etc.) may be stored within any conventional or other data structures (e.g., files, arrays, lists, stacks, queues, records, etc.) and may be stored in any desired storage unit (e.g., database, data or other repositories, queue, etc.). The data transmitted between user device 105 and server 155 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to generating semantically-similar phrases (e.g., user corpora, phrase corpora, user documents, etc.) may include any information provided to, or generated by, user device 105 and/or server 155. Data relating to generating semantically-similar phrases may include any desired format and arrangement, and may include any quantity of any types of fields of any size to store any desired data. The data relating to generating semantically-similar phrases may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to generating semantically-similar phrases), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of generating semantically-similar phrases based on the context of the phrases.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., reader module 115, user tracking module 120, corpus module 122, context module 160, candidate module 165, etc.). These systems may include any types of monitors and input devices (e.g., keyboard, mouse, voice recognition, etc.) to enter and/or view information.

It is to be understood that the software (e.g., reader module 115, user tracking module 120, corpus module 122, context module 160, candidate module 165, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., reader module 115, user tracking module 120, corpus module 122, context module 160, candidate module 165, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to generating semantically-similar phrases). The database system may be implemented by any number of any conventional or other databases, data stores or storage structures (e.g., files, databases, data structures, data or other repositories, etc.) to store information (e.g., data relating to generating semantically-similar phrases). The database system may be included within or coupled to the server and/or client systems. The database systems and/or storage structures may be remote from or local to the computer or other processing systems, and may store any desired data (e.g., data relating to generating semantically-similar phrases).

The present invention embodiments may employ any number of any type of user interface (e.g., Graphical User Interface (GUI), command-line, prompt, etc.) for obtaining or providing information (e.g., data relating to generating semantically-similar phrases), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for processing a document, the method comprising:

monitoring a user viewing a displayed text and determining that the user is experiencing difficulty understanding a query phrase in a displayed text, wherein the displayed text is translated from a first language to a second language;

generating one or more alternative phrases for the query phrase by:

determining a plurality of candidate phrases based on a context of the query phrase and a tone of the displayed text, wherein the context of the query phrase includes one or more words, in the second language, that are adjacent to the query phrase in the displayed text, and wherein each candidate phrase is determined by analyzing a phrase corpus in the second language to select candidate phrases that are adjacent to occurrences of the one or more words in the phrase corpus, scoring each of the plurality of candidate phrases, wherein the plurality of candidate phrases are scored based on a frequency of the context of the query phrase appearing adjacent to each candidate phrase in the phrase corpus compared to a frequency of other contexts appearing adjacent to the candidate phrase in the phrase corpus, and selecting a candidate phrase to be the alternative phrase based on the score of the candidate phrase; and presenting the one or more alternative phrases to the user.

2. The computer-implemented method of claim 1, wherein the phrase corpus is selected based on a monitored emotional state of the user.

3. The computer-implemented method of claim 2, wherein the context of the query phrase includes one or more of a preceding context, a succeeding context, and a cradle context.

4. The computer-implemented method of claim 1, wherein presenting the one or more alternative phrases comprises presenting a highest-scored candidate phrase to the user, and further comprises: in response to an interaction by the user, presenting a candidate phrase with a next-highest score.

5. The computer-implemented method of claim 1, further comprising: enabling the user to manually select a phrase for replacement with an alternative phrase.

6. The computer-implemented method of claim 1, wherein scoring each of the plurality of candidate phrases further comprises using a plurality of suffix arrays to score the plurality of candidate phrases in parallel.

7. A computer system for processing a document, the computer system comprising:

one or more computer processors;

one or more computer readable storage media;

program instructions stored on the one or more computer readable storage media for execution by at least one of the one or more computer processors, the program instructions comprising instructions to:

monitor a user viewing a displayed text and determining that the user is experiencing difficulty understanding a query phrase in a displayed text, wherein the displayed text is translated from a first language to a second language;

generate one or more alternative phrases for the query phrase by:

determining a plurality of candidate phrases based on a context of the query phrase and a tone of the displayed text, wherein the context of the query phrase includes one or more words, in the second language, that are adjacent to the query phrase in the displayed text, and wherein each candidate phrase is determined by analyzing a phrase corpus in the second language to select candidate phrases that are adjacent to occurrences of the one or more words in the phrase corpus, scoring each of the plurality of candidate phrases, wherein the plurality of candidate phrases are scored based on a frequency of the context of the query phrase appearing adjacent to each candidate phrase in the phrase corpus compared to a frequency of other contexts appearing adjacent to the candidate phrase in the phrase corpus, and selecting a candidate phrase to be the alternative phrase based on the score of the candidate phrase; and present the one or more alternative phrases to the user.

8. The computer system of claim 7, wherein the phrase corpus is selected based on a monitored emotional state of the user.

9. The computer system of claim 8, wherein the context of the query phrase includes one or more of a preceding context, a succeeding context, and a cradle context.

10. The computer system of claim 7, wherein presenting the one or more alternative phrases comprises presenting a highest-scored candidate phrase to the user, and further comprises: in response to an interaction by the user, presenting a candidate phrase with a next-highest score.

11. The computer system of claim 7, further comprising instructions to: enable the user to manually select a phrase for replacement with an alternative phrase.

12. The computer system of claim 7, wherein the instructions to score each of the plurality of candidate phrases further comprise instructions to use a plurality of suffix arrays to score the plurality of candidate phrases in parallel.

13. A computer program product for processing a document, the computer program product comprising one or more computer readable storage media collectively having program instructions embodied therewith, the program instructions executable by a computer to cause the computer to:

monitor a user viewing a displayed text and determining that the user is experiencing difficulty understanding a query phrase in a displayed text, wherein the displayed text is translated from a first language to a second language;

generate one or more alternative phrases for the query phrase by:

determining a plurality of candidate phrases based on a context of the query phrase and a tone of the displayed text, wherein the context of the query phrase includes one or more words, in the second language, that are adjacent to the query phrase in the displayed text, and wherein each candidate phrase is determined by analyzing a phrase corpus in the second language to select candidate phrases that are adjacent to occurrences of the one or more words in the phrase corpus, scoring each of the plurality of candidate phrases, wherein the plurality of candidate phrases are scored based on a frequency of the context of the query phrase appearing adjacent to each candidate phrase in the phrase corpus compared to a frequency of other contexts appearing adjacent to the candidate phrase in the phrase corpus, and selecting a candidate phrase to be the alternative phrase based on the score of the candidate phrase; and present the one or more alternative phrases to the user.

14. The computer program product of claim 13, wherein the phrase corpus is selected based on a monitored emotional state of the user.

15. The computer program product of claim 14, wherein the context of the query phrase includes one or more of a preceding context, a succeeding context, and a cradle context.

16. The computer program product of claim 13, wherein presenting the one or more alternative phrases comprises presenting a highest-scored candidate phrase to the user, and further comprises: in response to an interaction by the user, presenting a candidate phrase with a next-highest score.

17. The computer program product of claim 13, further comprising instructions to: enable the user to manually select a phrase for replacement with an alternative phrase.

18. The computer program product of claim 13, wherein the instructions to score each of the plurality of candidate phrases further comprise instructions to use a plurality of suffix arrays to score the plurality of candidate phrases in parallel.

* * * * *